United States Patent [19]

Pleyer et al.

[11] Patent Number: 5,790,115
[45] Date of Patent: Aug. 4, 1998

[54] SYSTEM FOR CHARACTER ENTRY ON A DISPLAY SCREEN

[75] Inventors: Sven Pleyer, Redmond; Edwin Thorne, III, Seattle; JoGene Kapell, Bellevue; Steven Roren Wallace; Daniel James Brown, both of Woodinville, all of Wash.

[73] Assignee: Microsoft Corporation, Redmond, Wash.

[21] Appl. No.: 530,592

[22] Filed: Sep. 19, 1995

[51] Int. Cl.⁶ .................. G06F 9/00; G06F 3/14
[52] U.S. Cl. .................. 345/327; 345/353; 345/341
[58] Field of Search .................. 395/327, 339, 395/341, 343, 347, 352, 792, 793, 803; 345/123, 353, 327, 339, 341, 343, 347, 352

[56] References Cited

U.S. PATENT DOCUMENTS

| | | | |
|---|---|---|---|
| 4,763,356 | 8/1988 | Day, Jr. et al. | 395/347 |
| 4,862,390 | 8/1989 | Weiner | 395/341 |
| 5,276,794 | 1/1994 | Lamb, Jr. | 395/347 |
| 5,524,195 | 6/1996 | Clanton, III et al. | 395/327 |
| 5,623,613 | 4/1997 | Rowe et al. | 395/341 |

Primary Examiner—Raymond J. Bayerl
Assistant Examiner—Cao H. Nguyen
Attorney, Agent, or Firm—Jones & Askew

[57] ABSTRACT

In association with an interactive television system, a system for displaying a control object in which characters may be entered or edited via a character spin dial. Each character and empty space in which a character may be entered is displayed in a separate cell within the control object. Each cell accepts entry or editing of characters therein via a character spin dial. The character spin dial is displayed to the user as an up arrow and a down arrow displayed above and below the cell, respectively. By manipulating a directional control on a remote control associated with the interactive television network in the up or down position, the user scrolls the character spin dial through a list of selectable characters until the desired character is displayed in the cell.

45 Claims, 8 Drawing Sheets

ས,790,115

SYSTEM FOR CHARACTER ENTRY ON A DISPLAY SCREEN

TECHNICAL FIELD

The present invention relates generally to interactive network systems and, more specifically, to a system for entering characters in a control object on a display screen.

BACKGROUND OF THE INVENTION

Cable television systems, sometimes referred to as community-antenna television (CATV) systems, are broadband communications networks of coaxial cable and optical fiber that distribute video, audio, and data signals to the homes or businesses of subscribers. In a typical CATV system, a single advantageously located antenna array feeding a cable network supplies each individual subscriber with a usable television signal.

CATV networks have experienced enormous growth and expansion in the United States, particularly in urban areas. It is estimated that CATV networks currently pass near and are accessible to approximately 90% of the population in the United States, with approximately 60–65% of all households actually being connected to such communications networks. While cable systems originally had very simple architectures and provided a limited number of different television signals, the increase in the number of television broadcasters, owners, and services over the last several decades has resulted in much more complex modern cable distribution systems.

A typical CATV system for the delivery of television programming to subscribers comprises three main elements: a headend, a distribution system, and subscriber drops.

The "headend" is a signal reception and processing center that collects, organizes, and distributes signals. The headend receives satellite-delivered video and audio programming, over-the-air broadcast television station signals, and network feeds delivered by terrestrial microwave and other communication systems. In addition, headends may inject local broadcast programming into the package of signals sent to subscribers, such as commercials and live programs created in a television studio.

The "distribution system" carries the signals from the headend to a number of distribution points in a community and, in turn, distributes these signals to individual neighborhoods for delivery to subscribers. A modern distribution system typically comprises a combination of coaxial cable and optical fibers with trunk amplifiers periodically spaced to compensate for attenuation of the signals along the line.

"Subscriber drops" are taps in the distribution system that feed individual 75Ω coaxial cable lines into subscribers' television sets or subscriber set-top terminals, often referred to as "subscriber premises equipment" or "customer premises equipment" ("CPE").

CATV distribution systems were originally designed to distribute television signals in the "downstream" direction only, i.e., from a central headend location to multiple subscriber locations, also referred to as the "forward" path. For downstream transmissions, typical CATV systems provide a series of video channels, each 6 MHz in bandwidth, which are frequency division multiplexed across the forward band, in the 50 MHz to 550 MHz region of the frequency spectrum. As optical fiber more deeply penetrates the service areas with hybrid optical fiber/coaxial cable (HFC) configurations, the bandwidth of the coaxial cable portion is expected to increase to over 1 GHz, thereby increasing the number of available channels for potential services.

The advent of pay-per-view services and other interactive television applications has fueled the development of bidirectional or "two-way" cable systems that also provide for the transmission of signals from the subscriber locations back to the headend via an "upstream" direction or a "reverse" path. By upgrading CATV systems employing relatively limited bandwidth coaxial cable with broadband distribution networks having HFC configurations, multiple service operators (MSOs) can use the additional channels gained by this wider bandwidth network to provide many new subscriber services. This ever-expanding deployment of fiber optic technology supports the implementation of an "interactive network" to allow a subscriber to obtain desirable service of programming at a time and date specified by the subscriber. Indeed, it is feasible that this interactive network will have sufficient bandwidth to supply hundreds of channels of programming information, thereby leading to an explosion of program options available to subscribers. Potential subscriber services supported by this interactive network include Movies on Demand (MOD) or Video on Demand (VOD), interactive computing, shopping, entertainment, and other related services.

The delivery of a variety of interactive services via a broadband network distribution system raises the critical issue of defining an efficient mechanism for presenting both operation and program-related information to an audience of possible consumers representing diverse technological backgrounds and interests. From an ergonomic perspective, this "user interface" for such an interactive network should appeal to a "typical" viewer of standard broadcast television programs and should be easy for this typical person to understand and use. Because computer users reflect only a portion of the overall audience for interactive services, it is desirable that the features of this user interface be based upon the assumption that the typical viewer is not familiar with user interface customs that are otherwise acceptable and understood by the computer-literate community. In addition, the functions of the user interface should be controllable with a control device familiar to this typical television viewer, such as a handheld remote control. This user interface also should be easily readable from a typical viewing distance that separates the viewer from a television screen.

The typical television viewer is accustomed to viewing sophisticated graphics for broadcast programs that are produced with complex and expensive production equipment. It is desirable for the user interface of an interactive network to support similar graphical features, including visual objects having a 3-dimensional appearance, image transition effects such as wipes, dissolves, and tumbles, and a variety of colors and fonts. This user interface also preferably supports active animation of displayed objects to entertain the viewer and to focus the viewer's attention upon a particular object for controlling a feature of the user interface. The user interface also should be sufficiently flexible in appearance to allow a service provider to design and implement objects having a unique appearance for different applications, thereby permitting a user to distinguish these applications.

From a technical perspective, the delivery of video signals for presentation by a conventional television screen is limited by the display screen variations in the numerous models of televisions and the limitations inherent in the National Television Systems Committee (NTSC) standards for formatting video signals. The NTSC has established title and video safety standards to define a space along the television screen for readable text and images. The area of the television screen that is considered to support the most reliable presentation of images, which is known as the "safe title" zone, is approximately the center 80% of the horizontal and vertical space of a television screen. Likewise, the area of the television screen that is considered to support the most reliable presentation of moving images, which is known as the "safe action" zone, is approximately the center 90% of the horizontal and vertical space of a television screen.

Because these NTSC standards suggest that the video performance of even modern television monitors suffers from horizontal and vertical drift problems, the user interface for an interactive network should support the video safety standards to ensure that objects intended for display are actually presented to the viewer. However, it will be appreciated that this implementation also effectively reduces "usable screen space" or display resolution for the user interface. This is dramatically different from the computer environment, where the entire screen of a computer monitor can predictably be used to present static and dynamic objects to a user.

The design of the user interface for an interactive network also must consider the well known phenomenon of "flicker" arising from the scanning of vertical and horizontal scan lines in a television screen. It would be desirable for the objects of a user interface for the interactive network to be drawn with lines having a pixel width of more than one pixel to reduce flicker and to support a more readable presentation of the displayed objects.

In summary, for an interactive network environment, there is a need for a user interface having simplified user interface controls that are optimized for the television environment in both appearance and behavior. The user interface should be entertaining and have the look of a television program. The controls of the user interface are preferably operable with a handheld control device, such as a remote control. The user interface should support NTSC video safety standards to ensure that objects intended for display are actually presented to the viewer in a manner that is easily readable on a variety of conventional television sets. The present invention addresses these issues by providing a user interface designed for use in the environment of an interactive network.

The many subscriber services supported by interactive television networks give users the ability to communicate with the network. The types of communications supported by subscriber services include entering characters or text on the display screen via a remote control or other similar device. The interactive television network typically displays a box or other object on the display screen in which character entry is permitted. The user then manipulates a remote control or other suitable input device to effect the entry of characters in the object on the display screen.

Existing methods of entering characters on the display screen include a hardware keyboard located on, or associated with, the remote control. However, hardware keyboards are large and bulky and may not be easy to manipulate for users who are unfamiliar with keyboard operations. Alternatively, characters may be entered via a 10-key pad on a remote control unit, similar to the numeric/alphabet keypad on standard touch-tone telephones. Each of the ten numerals may be mapped to a specific set of characters. The desired character can be entered by the user pressing the appropriate numeral on the keypad in a certain repetitive manner or other sequence. However, this method is cumbersome and requires that the user memorize a complex method of entry.

Other methods of character entry include providing displays on the display screen associated with the object in which character entry is permitted. These displays may provide a list of all available characters that may be selected by the user in the form of a software keyboard. Other methods include a character wheel in which a list including a subset of all selectable characters is displayed on the screen. The user then scrolls through the list to select the desired character. Because these methods require the display of many characters on the screen that must be able to be differentiated by a user, these methods typically consume a large portion of display screen space.

A wide range of other similar methods of character entry are available. However, most methods of character entry either require a cumbersome hardware component or require a display that consumes a substantial portion of display screen space. Thus, for subscriber services in which display screen space is at a premium, most prior methods are unacceptable.

Any method of character entry should therefore require no cumbersome hardware components, require a minimum of display screen space, and should provide users with a visual indication of the method of character entry such that the user need not memorize complex techniques that may be easily forgotten.

SUMMARY OF THE INVENTION

The present invention provides a system for character entry and editing on a television display screen. A control object is displayed on the display screen in association with an interactive television system. When the user desires to enter or edit text in a control object, the user first selects the control object by manipulating a directional control on a remote control to put focus on the control object. The user then presses an action button on the remote control which operates to expand the characters displayed in the control object and segment each character in a separate cell. Each cell can receive a character, or each character already present in a cell can be edited, via a character spin dial. The character spin dial is visually displayed on one cell in the form of an up arrow displayed above the cell and a down arrow displayed below the cell. By manipulating the directional control of the remote control to the up or down positions, the user scrolls the spin dial through a list of characters that can be entered in the cell. The character spin dial displays only one character in the cell at any one time. When the desired character is scrolled into the cell, the user enters it in the cell by pressing the directional control to the left or right position to shift the character spin dial to an adjacent cell or, alternatively, by pressing the action button. Each cell displayed in the control object can be provided with a character spin dial, although only one cell may have a character spin dial at any one time.

Thus, it is an object of the present invention to provide a system for entering and editing characters in a control object on a display screen.

It is another object of the present invention to provide a system for entering and editing characters in which enlarged and segmented characters are displayed in a control object.

It is a further object of the present invention to provide a character spin dial for scrolling through a list of characters that may be entered.

It is a still further object of the present invention to provide a system for entering characters in a control object on a display screen that utilizes a minimum of screen space.

Other objects, features, and advantages of the present invention will become apparent upon reading the following specification, when taken in conjunction with the drawings and the appended claims.

DETAILED DESCRIPTION OF THE PREFERRED EMBODIMENT

Figure 1:
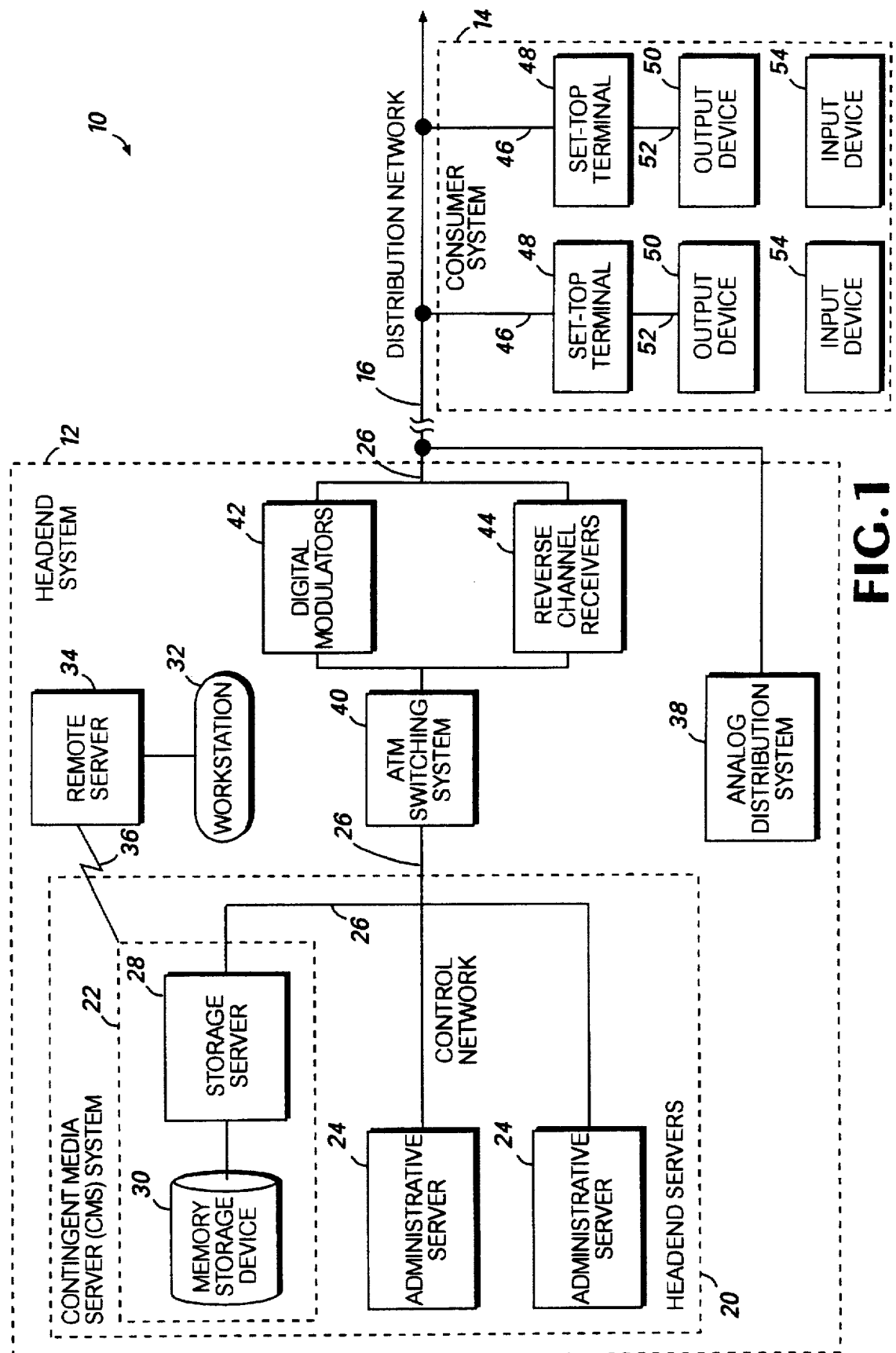
FIG. 1 is a block diagram of the operating environment for an interactive network system.

Turning next to the figures, the preferred embodiment will now be described in detail. The present invention is directed to a system for entering and editing characters in a control object on a display screen in connection with a subscriber service of an interactive network system. Although the preferred embodiment of the present invention will be described with respect to subscriber services displayed to a user on a television display screen, those skilled in the art will recognize that the present invention may be utilized in connection with other forms of communications media and other input and output display devices.

In general, the present invention provides a system for displaying a control object in which characters may be entered or edited. The control object displays previously entered characters or empty spaces in an enlarged and segmented manner. Each character and empty space in which a character may be entered is displayed in a separate cell. Each cell can accept the entry or editing of characters therein via a character spin dial. The character spin dial is displayed to the user as an up arrow and a down arrow displayed above and below the cell, respectively. By manipulating the directional control on the remote control in the up or down position, the user scrolls the character spin dial through a list of selectable characters until the desired character is displayed in the cell. In this manner, the user can enter or edit characters in each cell.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Furthermore, it should be understood that there is a distinction between the methods, steps, or operations completed by a computer, and the method of computation itself. The present invention does not involve a method of computation. Instead, the present invention relates to methods, processes, steps, or operations for a computer and the processing of electrical or other physical signals to generate desired physical signals and to display results and interactions.

The preferred embodiment of the present invention is directed to a user interface for an interactive network system that can deliver a variety of services, including entertainment, information, and transaction services, to consumers via an interactive broadband network. This user interface, which is typically presented via an output device, such as a display or monitor, can include one or more control items or images representing various control functions associated with the operation of the interactive network. For example, the user interface can include control items representing functions for controlling a display of available program options. The present invention provides a system for both "highlighting" the currently selected control item and for supplying the user with an indication of other control items that are available for selection by the user. The innovative solution provided by this system addresses the requirements of limited display "real estate" for displaying such control images, as well as the dynamic nature of programming information presented by the interactive network.

Although the preferred embodiment will be generally described as an interactive television system for delivering broadcast television programs and related information, those skilled in the art will recognize that the present invention also can be used to support the delivery of other forms of programming information, including radio, broadcast print, audio, games, computer software, including program modules such as application programs and operating systems, and other combinations of audio, video and/or computer software. Accordingly, it will be understood that programming information generally includes information transmitted electronically to entertain, instruct, educate, or inform the recipient, as well as program modules for supporting these services.

Likewise, those skilled in the art will also appreciate that the present invention can be extended to communicating control information within the general purpose computing environment. Specifically, the present invention supports user interfaces for displaying control information with general purpose computer systems, including desktop computers, portable computers, and handheld computers, including personal digital administrators.

Turning now to the drawings, in which like numerals indicate like elements throughout the several figures, FIG. 1 illustrates the operating environment for an interactive network system. Referring to FIG. 1, the interactive network system 10 includes a headend system 12 for delivering programming information to and receiving instructions from a consumer system 14 via a "two-way" distribution network 16. The headend system 12 is the control center for collecting, organizing, and distributing the signals for all interactive network operations and the source for all programming information. The distribution network 16 transports signals carrying programming information and instructions between the headend system 12 and the consumer system 14. The distribution network 16 can include a worldwide public asynchronous transfer mode (ATM) compatible network with links to the Internet, third party service providers, and other wired and wireless communications networks. The consumer system 14 includes the equipment required for a consumer to receive programming information directly at his or her office or residence and to transmit requests and instructions to the headend system 12.

The headend system 12 can include a set of headend servers 20, including a continuous media server (CMS) system 22 and one or more administrative servers 24, to support various network functions, and a control network 26 linking these headend servers. The headend servers 20 can execute program modules, including service and application program software, to support the transmission of programming information and the reception of requests for such programming information.

It will be appreciated that the headend servers 20 are not necessarily located in one physical location, but can be linked by wired and/or wireless communications paths supplied by the control network. The control network 26 can be a local area network, a wide area network, or a combination of both types of networks. For the preferred embodiment, the control network 26 is implemented as an ATM-based network for routing digital data between the headend servers 20 and the distribution network 16.

The CMS system 22 is a server-based file storage and delivery system that can manage on-demand access to stored digitized data. On-demand access of digitized data is a particularly desirable characteristic of the CMS system 22 if the interactive network supports the delivery of Video on Demand (VOD) or Movies on Demand (MOD) services. The preferred CMS system 22 can supply digital data streams at a constant rate to numerous consumers of the consumer system 14.

The CMS system 22 includes one or more storage servers 28, which operate to retrieve and to transmit the digitized data as required by clients of the CMS system, i.e., the equipment of the consumer system 14. The digitized data, which typically comprises programming information, is maintained on one or more memory storage devices 30 connected to the storage servers 28. Each memory storage device 30 can be implemented as a SCSI hard disk drive, an optical storage system, or any other similar mass storage media. By spreading the data management operations across a group of storage servers and memory storage devices, user load can be balanced with the limited disk, network, and input/output (I/O) resources of the headend system. This also supports fault tolerance by replicating digitized data within the CMS system 22 to survive the failure of a storage server or a memory storage device.

To support the tasks of updating or revising programming information stored on a memory storage device 30 of the CMS system 22, a computer workstation 32 and a remote server 34 can be connected to the control network 26 via a communications link 36. This communications link allows a program distributor or supplier, which typically operates at a location remote from the CMS system 22, to transmit programming information for storage by one or more of the memory storage devices 30 and eventual distribution to consumers via the headend system 12. The communications link 36 can be implemented by either a wireless or wired communications system. For example, the communications link 36 can be constructed as a microwave link or as a conventional telephone link.

The administrative servers 24 of the headend system 12 can support a variety of services and applications associated with the interactive network system 10, including network security, monitoring, object storage, financial transactions, data management, and other administrative functions. The administrative servers 24 also handle the interactive service requests or instructions transmitted via the consumer system 14 by consumers. For an application involving a large base of consumers, an administrative server 24 is preferably dedicated to a particular service or function. For example, one or more servers can handle all consumer authorization requirements, whereas other servers can handle network management services, and so forth. These administrative servers preferably support the Simple Network Management Protocol (SNMP) to enable end-to-end network administration and monitoring.

The headend system 12 also can support the distribution of programming information and other services via an analog distribution system 38 that is coupled to the distribution network 16. This distribution of analog formatted signals can be handled by a separate headend system associated with a community antenna television (CATV) system. The headend of the CATV system typically supports satellite-delivered video and audio programs, over-the-air broadcast television station signals, and broadcast network signal feeds delivered by microwave and other communications systems.

The distribution network 16 is a two-way communications network that connects the headend system 12 to various community distribution points of the consumer system 14 and, in turn, to individual neighborhood nodes for delivery to consumers of services supplied by the interactive network system 10. The distribution network 16 comprises one or more downstream channels supporting transmissions from the headend system to the consumer system and one or more upstream channels for carrying transmissions from the consumer system to the headend system. This bidirectional communications network supports delivery of programming information via the headend system 12 to each consumer and the delivery of requests for programming information by a consumer to the headend system 12. The distribution network 16 can be implemented by a microwave distribution system, a telephone system, coaxial cables, optical fibers, or any combination of these delivery systems. However, the preferred distribution network is implemented by a combination of hybrid optical fiber/coaxial cable (HFC) and optical fiber-to-the-curb (FTTC).

Those persons skilled in the art will appreciate that the programming information delivered over the distribution network 16 typically comprises both video and audio signals. Programming information can be delivered in digital format, analog format, or a combination of both analog and digital formats. For the preferred embodiment, television-related programming is delivered as a stream of digital video and/or audio signals in a compressed digital data stream, including conventional MPEG-1 and MPEG-2 compressed video streams. Likewise, requests or instructions issued by consumers via the consumer system 14 are preferably formatted as digital signals.

The CMS system 22 and the administrative servers 24 are connected to the distribution network 16 via an ATM switching system 40. The ATM switching system 40 supports network switching requirements for delivery by the headend system 12 of digital data streams carrying multimedia content and the handling of interactive service requests from consumers.

Because the interactive network 10 is a two-way communications system, the ATM switching system 40 preferably connects to the distribution network 16 via modulation/demodulation devices. The downstream channels of the distribution network 16 can be connected to the ATM switching system 40 via digital modulators 42, whereas the reverse channels of the distribution network 16 are connected to reverse channel receivers 44.

Each consumer within a neighborhood node of the consumer system 14 is connected to the distribution network 16 via a subscriber drop cable 46, which is typically part of a local cable network administered by a multiple service operator (MSO). The drop cable 46 is typically a coaxial cable or optical fiber connected to a set-top terminal 48 or set-top box located at the consumer's location. This combination of the drop cable 46 and the set-top terminal 48 operates as a "tap" into the distribution network 16, and allows the consumer to (1) receive program modules and programming information distributed by the headend system 12 and to (2) transmit requests or instructions to the headend system 12. For example, the set-top terminal 48 can accept and convert signals carrying programming information to a format compatible for presentation by an output device 50, such as a television or a computer system. This output device 50, which can be connected to the set-top terminal via a conductive path 52 such as coaxial cable, preferably includes a receiver and a display or monitor for receiving and displaying programs and program-related information. Those skilled in the art will understand that the output device 50 can be implemented as a combination of separate components, such as a receiver and a monitor, or as a single component, such as a conventional television or a general purpose computer system.

Selected operating functions of the set-top terminal 48 can be controlled by an input device 54 capable of supplying input data to the set-top terminal 48. The input device 54 can be used to transmit command signals to the set-top terminal 48 and to input character-based data, such as text, for processing by the set-top terminal 48. For example, the input device 54 can be used to control the position of a display object presented by the output device or to enter text for conducting a service-related transaction supported by the interactive network 10. The input device 54 can be implemented as one or more devices for inputting data, including a handheld control, a keyboard, a mouse device, a game control, a joystick, a pen or stylus, a trackball, or a track pad.

For the preferred embodiment, the input device 54 is implemented as a handheld remote control capable of transmitting infrared signals carrying commands for controlling the operation of the set-top terminal 48. The remote control can include a directional keypad having distinct keys, or a joystick, for allowing the user to control direction (up, down, left, right) and relative changes in volume or channel (increase or decrease), as well as absolute changes to channel value via a numeric key pad. The remote control and its functions are more fully described with respect to FIG. 3.

Figure 2:
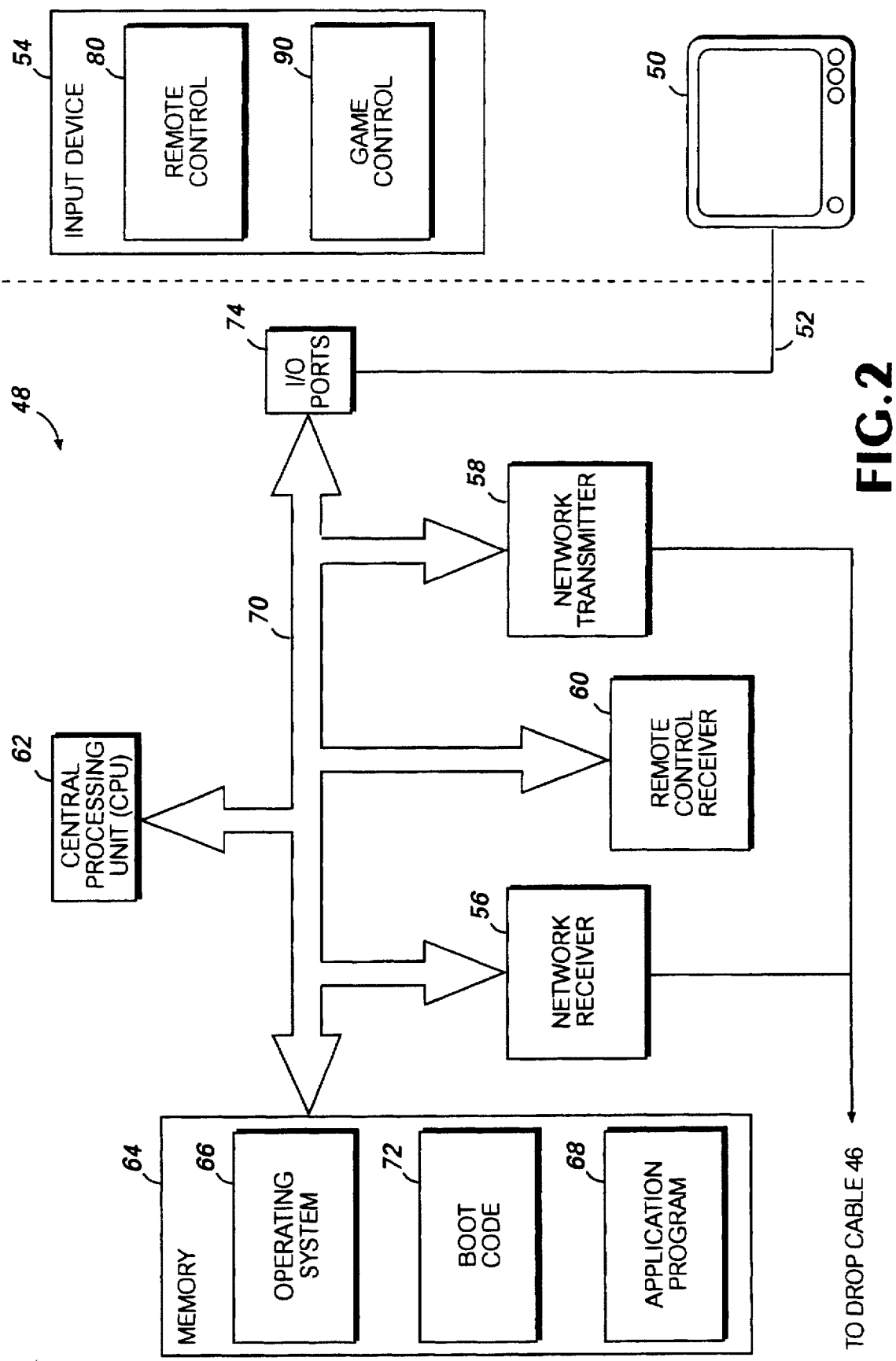
FIG. 2 is a block diagram of the basic components of a set-top terminal.

FIG. 2 illustrates the basic components of the set-top terminal 48. Turning now to FIGS. 1 and 2, the primary components for the set-top terminal 48 include a network receiver 56, a network transmitter 58, a remote control receiver 60, a central processing unit (CPU) 62, and memory 64. These components are connected by a system bus 70, which can carry control, address, and data signals. The network receiver 56 conducts tuning operations for receiving a selected channel of the interactive network 10 and decoding operations for decoding compressed digitized data supplied via the interactive network 10. For example, the set-top terminal 48 can include MPEG decoding capability for converting the compressed digitized data into standard National Television Standard Committee (NTSC) video signals for reception by a conventional television. The network transmitter 58 transmits requests for programming information and related instructions for processing by the headend system 12. The network receiver 56 and the network transmitter 58 can be connected to the distribution network 16 via the drop cable 46. The remote control receiver 60, which is preferably implemented as an infrared receiving device, can decode signals carrying the commands issued by the input device 50, such as a remote control 80.

The CPU 62, which is connected to the network receiver and transmitter 56 and 58, as well as to the remote control receiver 60, controls the operations of the set-top terminal 48 and supports the rendering of graphical images of the user interface. The CPU 62 is typically implemented by at least one microprocessor, such as the model 80486 or the "PENTIUM" microprocessor, manufactured by Intel Corporation, Santa Clara, Calif. The CPU 62 communicates, by means of control, address, and data signals, with the remaining components of the set-top terminal 48 through the system bus 70. The CPU 62 operates in conjunction with the operating system 66 to retrieve, process, store, and display data. It will be appreciated that the processing functions of the CPU 62 may be divided among two or more microprocessors to support the presentation of a graphics-intensive user interface. For example, a microprocessor may be dedicated to control operations associated with the bidirectional communications with the headend system 12, whereas another microprocessor may be dedicated to the generation of graphics.

The memory 64, which is connected to the CPU 62, is useful for storing one or more program modules and data associated with set-top terminal operations. Program modules stored in the memory 64 can include an operating system 66 and one or more application programs 68. The memory 64 can be implemented as a combination of dynamic memory, such as random access memory (RAM), and static memory, such as read only memory (ROM).

The operating system 66 comprises a set of computer programs that control the internal functions of the set-top terminal and support the execution of other program modules, including application programs 68. The preferred operating system 66 supports a graphics-based presentation of program-related information, including control items that visually represent control functions of the operating system and other program modules. A control item is any visual image that can be manipulated by the user to perform an operation. The operating system 66 can receive and interpret input data supplied by the input device 54, as received by the remote control receiver 60. As will be described in more detail below with respect to FIG. 3, a user can "select" and "launch" control items by the use of the input device 54 in a manner similar to the computer arts.

For the preferred set-top terminal 48, the memory includes a ROM containing at least a portion of program module representing "boot code" 72 for initializing the operations of the set-top terminal 48. Upon power-up of the set-top terminal 48, the boot code 72 initiates a request for the headend system 12 to download certain program modules, including the operating system 66 and one or more application programs 68. The program modules can be stored within the memory 64 of the set-top terminal 48. This downloading process allows the headend system 12 to easily update the program modules used in set-top terminals 48 throughout the interactive network 10. For example, the application programs 68 may be maintained within the set-top terminal 48 only during actual use of the features of these programs; otherwise, these application programs are maintained at the headend system 12. Thus, it will be appreciated that the preferred set-top terminal 48 relies heavily upon data storage mechanisms located at the headend system 12 rather than within the set-top terminal 48 itself.

The set-top terminal 48 can be connected to a peripheral device via input/output (I/O) ports 74. The I/O ports 74 support the connection of the system bus 70 to a connected peripheral device. For example, the output device 50 can be connected to the I/O ports 74 via a conductor 52. Likewise, an input device 54, such as a game control 90, can be connected to the I/O ports 74. In contrast to the remote control 80, which communicates with the remote control receiver 60 via a wireless communications link, other types of input devices 54 are typically connected to the I/O ports 74 via a cable. Nevertheless, those skilled in the art will appreciate that input devices 54 can communicate with the set-top terminal 48 by use of either wireless or wired communications links.

Generally, when a user first powers-up a set-top terminal 48, the set-top terminal 48 contacts the headend system 12 and requests the downloading of certain program modules, including the operating system 66. In response to loading these program modules, the set-top terminal 48 enters a stand-by mode to limit power consumption and awaits a command signal initiated by a user pressing a key or button on an input device 54, such as a remote control 80. In this stand-by mode, the set-top terminal can communicate with the headend system and can respond to administrative requests transmitted by the headend system 12. In the event that a user tunes to an interactive channel (typically by pressing the appropriate function key of the remote control), the set-top terminal 48 changes modes and enters the active mode. In the active mode, the set-top terminal 48 communicates with the headend system 12 to process the instructions transmitted by the remote control. For example, the set-top terminal 48 responds to a command requesting programming information by forwarding this instruction to the headend system 12 via the drop cable 46 and the distribution network 16. The headend system 12 responds by retrieving selected programming information from the CMS system 22 and transmitting the selected programming information via the return path provided by the distribution network 16 and the drop cable 46. The set-top terminal then supplies this programming information in the proper format for presentation by the display.

In accordance with the present invention, the output device 50 in connection with an interactive network system 10 displays information on a display, preferably a television display screen, as shown in FIGS. 4–7. The various subscriber services may display control objects to the user via the display screen in which the user may enter or edit characters therein.

Figure 3:
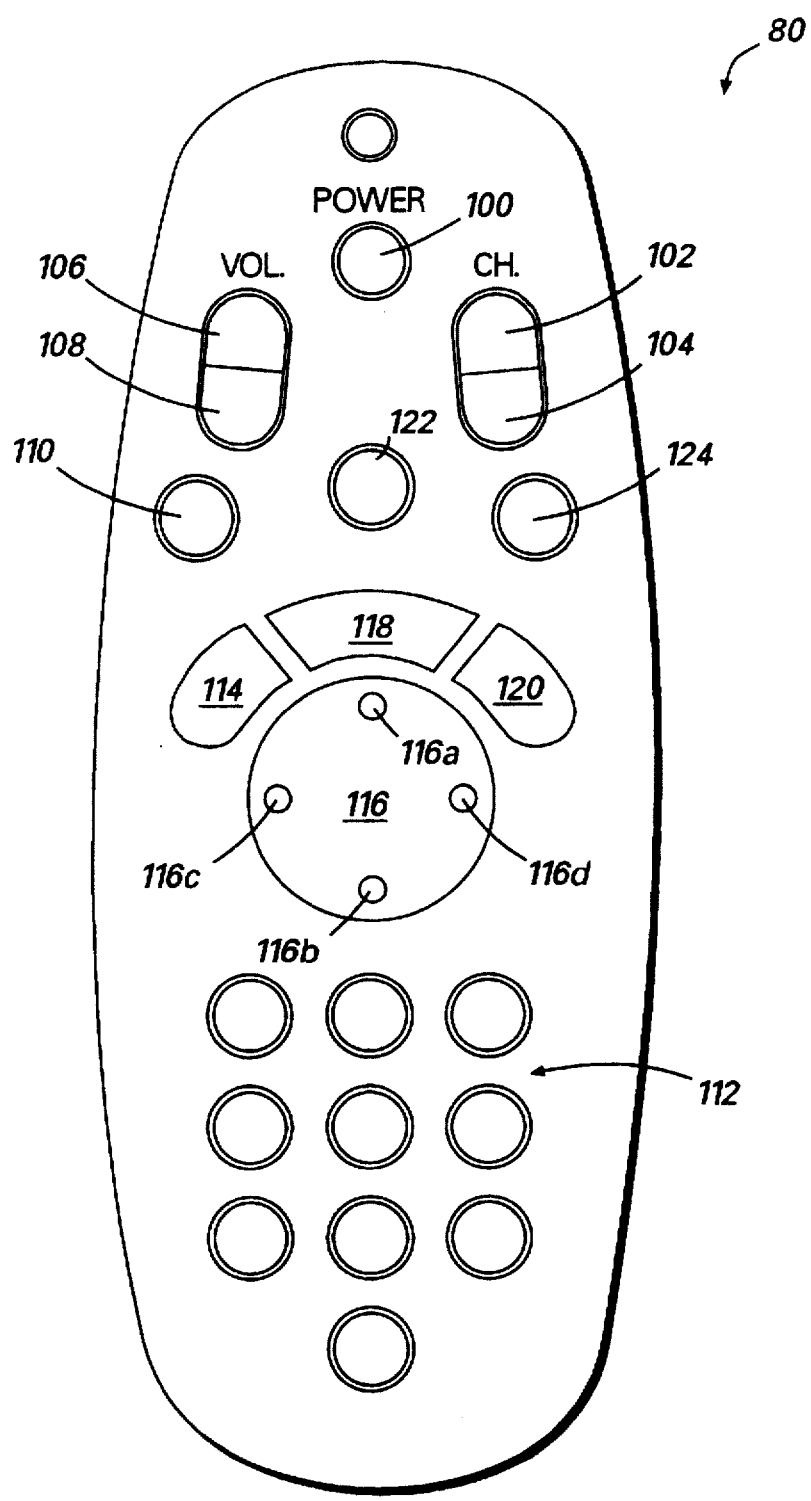
FIG. 3 shows the face of a remote control unit for communicating with the set-top terminal.

The preferred embodiment of the present invention utilizes a remote control 80, shown in FIG. 3. It should be understood that the present invention is not limited to the use of the remote control unit shown in FIG. 3, but can be utilized with any suitable remote control unit. Similarly, the user can manipulate the control objects displayed via buttons, knobs, or other control mechanism on the set-top terminal itself rather than the remote control. Thus, it should be understood that the remote control is the preferred method by which the user communicates with the set-top terminal to manipulate objects on the display screen and initiate action of the interactive system, but that any suitable method of communication with the set-top terminal will suffice.

FIG. 3 illustrates the preferred remote control unit 80, which is used to transmit commands to the set-top terminal 48. The remote control unit 80 includes a variety of keys that are common to remote control units for use with conventional television sets. These include power on/off 100, channel up 102, channel down 104, volume up 106, volume down 108, mute 110, and a 10 digit numeric keypad 112.

The preferred remote control unit also includes keys that are specifically related to the preferred interactive system. A menu button 114 is used to open and close on-screen menus, such as a channel manger object. A directional control 116 is a rocker switch that is used to manipulate the channel manager and select specific items by moving a cursor up, down, left or right. The directional control 116 can be moved in any of four positions: the up position 116a, the down position 116b, the left position 116c, and the right position 116d. An action button 118 is used to launch a selected function. A help key 120 is to initiate on-screen help. An "A" button 122 and "B" button 124 are used to select specific options that are provided in some contexts.

Figure 4:
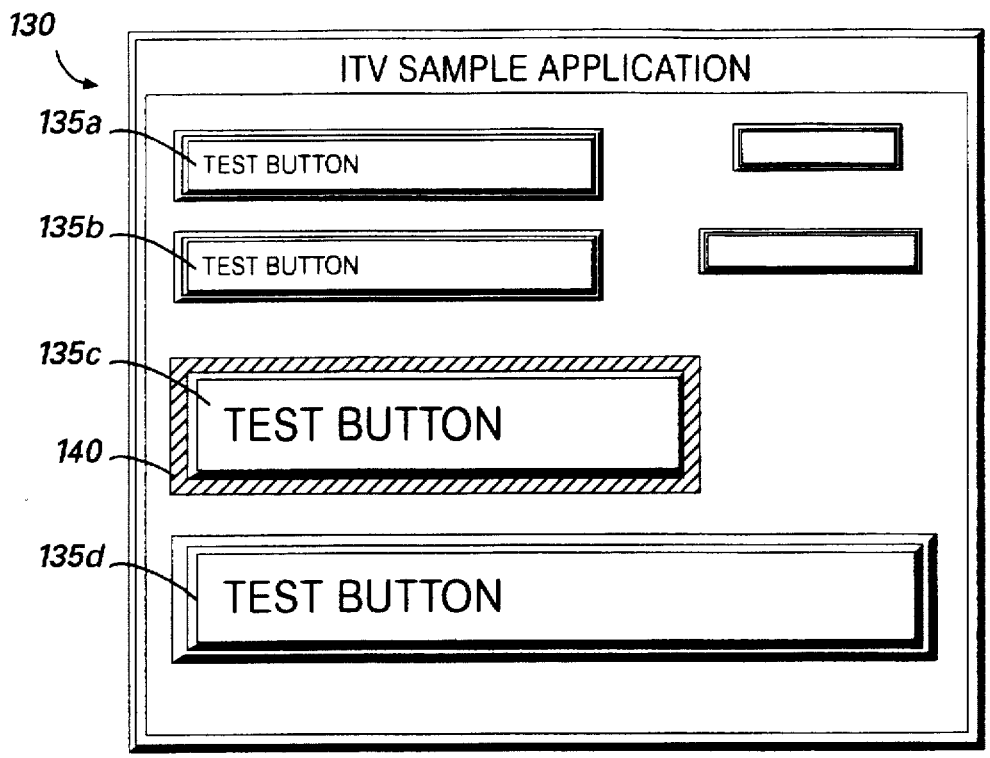
FIG. 4 is a sample display screen showing control objects in which character entry and editing is permitted.

An example of a display screen including control objects in which character entry is permitted is shown in FIG. 4. It should be understood that the display screen shown in FIG. 4 is for discussion purposes only and should not be construed to resemble all display screens in which character entry is permitted. Many other display screens associated with a wide range of subscriber services having other control objects for character entry exist but are not shown or discussed herein. However, the present invention is not limited merely to the displays provided and discussed herein and the present invention may be properly applied to many display screens provided in conjunction with various subscriber services associated with the interactive network.

The display screen 130 displays one or more control objects 135a–d in which character entry is permitted. For purposes of this discussion, the phrase "character entry" will encompass both the entry of characters where none previously existed and the editing of previously existing characters. Characters include letters of the alphabet, numbers, symbols, or any other characters defined by the system or service being utilized.

Character entry may be accomplished in only one control object at one time. Of the control objects 135a–d displayed on the display screen, the user selects the control object in which character entry is to be performed. In the display screen of FIG. 4, the user has selected control object 135c in which to perform character entry, as evidenced by the focus frame 140 surrounding the control object 135c.

As seen from control object 135c, the display of one control object on the display screen is altered or modified in a manner to allow the user to recognize that that particular object can be controlled by the user. This highlighting feature is called "focus", and is illustrated in FIG. 4 as a focus frame 140 comprising a thick border around the periphery of the control object. The focus frame 140 directs the user's attention to the control object and operates as an indication that the user can control and initiate actions in the object in the focus frame. It should be understood that the focus frame can utilize various highlighting features to demonstrate to the user that focus is on the particular control object. In addition to, or in place of, the thickened border surrounding the object having focus, focus can be demonstrated by magnification, color, audio, animation, graphics, or any other feature that serves to differentiate the control object having focus from adjacent control objects.

When the user chooses a subscriber service to be utilized, typically by pressing the menu button 114 on the remote control, a display associated with the service is displayed on the output device. It should be understood that additional control objects can be displayed on the display screen in addition to the control object 135c having focus. To select one control object in which to perform character entry, the user manipulates the directional control 116 of the remote control. The user operates the directional control 116 of the remote control to shift focus between any display objects displayed on the screen that can accept focus. Thus, the user positions focus on the control object 135c by manipulating the directional control of the remote control until the focus frame is displayed on the desired control object.

Focus may be moved between control objects displayed on the display screen by navigating. The user navigates by moving a cursor or other visible indication of control to different objects displayed on the display screen. Navigating can be accomplished by tabbing or roaming. Tabbing refers to a mode in which user input from the remote control indicates movement on the display screen that is constrained to a control object defined by the application programmer. When tabbing, the user presses the directional control 116 to move a cursor on the display screen. The software associated with the subscriber service being utilized moves the cursor to the next adjacent control object on the display screen that can accept focus. By contrast, roaming refers to a mode in which user input from the remote control indicates free movement of a cursor on the display screen in a specified direction. Typically, the user continues to press the directional control on the remote control in real-time until the cursor, or other object providing visual feedback, appears at the desired position.

When the user has positioned focus on the desired control object, (object 135c in FIG. 4), the user presses the action button 118 on the remote control. Pressing the action button puts the control object into the modal state. Once in the modal state, the display of the control object and its contents are altered. The altered display is discussed below with reference to FIG. 5, the preferred embodiment of the present invention.

The alteration of the display of the control object and its contents includes enlarging the characters displayed therein. Each character is enlarged within the borders of the control object but the size of the control object itself is not enlarged. Therefore, although the individual characters displayed within the control object 135c are enlarged, the size of the control object 135c remains constant. This is beneficial when display screen space is at a premium because the characters are enlarged for easier viewing by the user, yet the control object remains the same size such that surrounding display objects are not obscured or otherwise adversely affected.

Further alteration of the display of the contents of the control object when the control object is in the modal state includes the segmentation of characters. Each character is displayed in a distinct cell, shown at 150, 151, 152, 153, 154 in FIG. 5. The cells function to further differentiate each character in the control object. Each cell is preferably a predetermined, equal width capable of displaying any character. For example, if the widest character permitted to be displayed is the letter "M" and the narrowest is the letter "I", each cell will preferably be wide enough to display the letter "M". A cell displaying a narrow character will not be correspondingly narrowed but will be displayed at the predetermined width.

Because each character is enlarged and each cell is wide enough to accept the widest possible character, the characters within the control object are pushed toward the right and may extend beyond the border of the control object. However, any characters pushed beyond the right border 136 of the control object 135c will not be displayed until the user desires to enter or edit a character in the cell. This is consistent with the control object remaining the same size when in the modal state.

In the modal state, a character spin dial 160 is provided for a cell in the control object. The character spin dial can be used on any cell in the control object, but can only be used on one cell at any one time. The character spin dial contains a list of characters that are permitted to be entered into the cell to which the spin dial is applied. However, only one character is displayed in the cell at one time. For example, the spin dial may include all upper case letters of the alphabet (A–Z), all lower case letters of the alphabet (a–z), numerals 0–9, various punctuation marks (!, ?, ;, :, ", etc.), and any other character that may be desired. For example, the character spin dial may include graphics, symbols, or international characters used in foreign languages. Furthermore, certain editing functions may be provided by the spin dial, including an insert and delete function. Additionally, certain characters may be provided for specific subscriber services that may not be required for other services.

The application program being executed by the interactive network system has control over the character spin dial that is provided for each cell. Each character spin dial provided within each control object in which character entry is permitted can include a specified set of characters. Thus, the application program can set any desired character spin dial to include any type or group of characters. For example, if a control object is displayed that only accepts the entry of numerical characters, the application program may set the character spin dial to include only the numerals 0–9. Similarly, a control object that accepts only text may have a character spin dial that includes only the letters of the alphabet. In this manner, the application program controls the characters displayed by each character spin dial provided within each control object.

Figure 5:
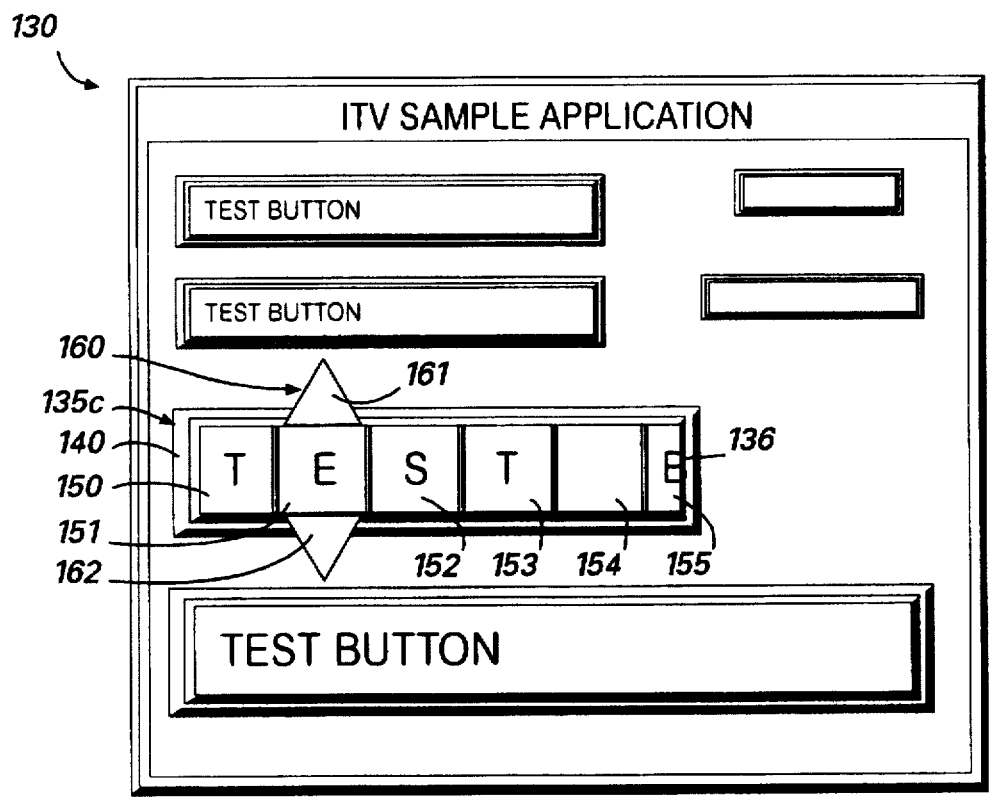
FIG. 5 shows a control object utilizing a character spin dial in accordance with the preferred embodiment of the present invention.

In the preferred embodiment of the present invention shown in FIG. 5, the character spin dial 160 comprises an up arrow 161 and a down arrow 162. The arrows 161, 162 serve as a visual indication to the user that manipulating the directional control of the remote control in the up or down direction will operate the spin dial. Therefore, to operate the character spin dial, the user manipulates the directional control 116 on the remote control 80 to the up position 116a or the down position 116b.

Pressing the directional control to the up position 116a causes the character spin dial to scroll upward through the characters in the list. Scrolling upward displays the immediately-preceding character in the list, i.e., the character toward the beginning of the list. Because the character spin dial is applied to cell 151, which displays the character "e", the first character to appear in the cell in place of "e" when the list is scrolled upward is the character "d", then "c", and so forth. Pressing the directional control to the down position 116b causes the character spin dial to scroll downward through the list in the opposite direction. Scrolling downward displays the immediately-succeeding character in the list, i.e., the character toward the end of the list. Thus, pressing the directional control to the down position causes the character "f" to be displayed in the cell, replacing "e". Continued pressing of the directional control to the down position causes "g" to be displayed, then "h", and so forth.

The user can use the character spin dial to scroll through the entire list of characters until the desired character appears in the cell. When the desired character is displayed in the cell 151, the user presses the directional control 116 to the left position 116c to shift the spin dial to the cell to the left or presses the directional control to the right position 116d to shift the character spin dial to the cell to the right of the cell to which the spin dial was applied. Thus, pressing the directional control to the left position 116c moves the character spin dial from cell 151 to cell 150. Similarly, pressing the directional control to the right position 116d moves the character spin dial from cell 151 to cell 152. When the user presses the directional control to the left or right to move the spin dial, the desired character selected via the spin dial is entered in the cell.

Therefore, the user can apply the character spin dial 160 to any cell displayed in the control object by manipulating the directional control to the left position 116c or right position 116d. Pressing the directional control to the right position when the character spin dial is positioned on the last completely displayed cell in the control object causes the cells to shift one position to the left. For example, if the spin dial is positioned on cell 154 and the directional control is pressed to the right position, cell 155 will be shifted to the left one cell such that it occupies the space previously occupied by cell 154. Thus, all cells are shifted one cell to the left. In this manner, all cells, even those extending beyond the right border of the control object, can utilize the character spin dial.

Figure 6:
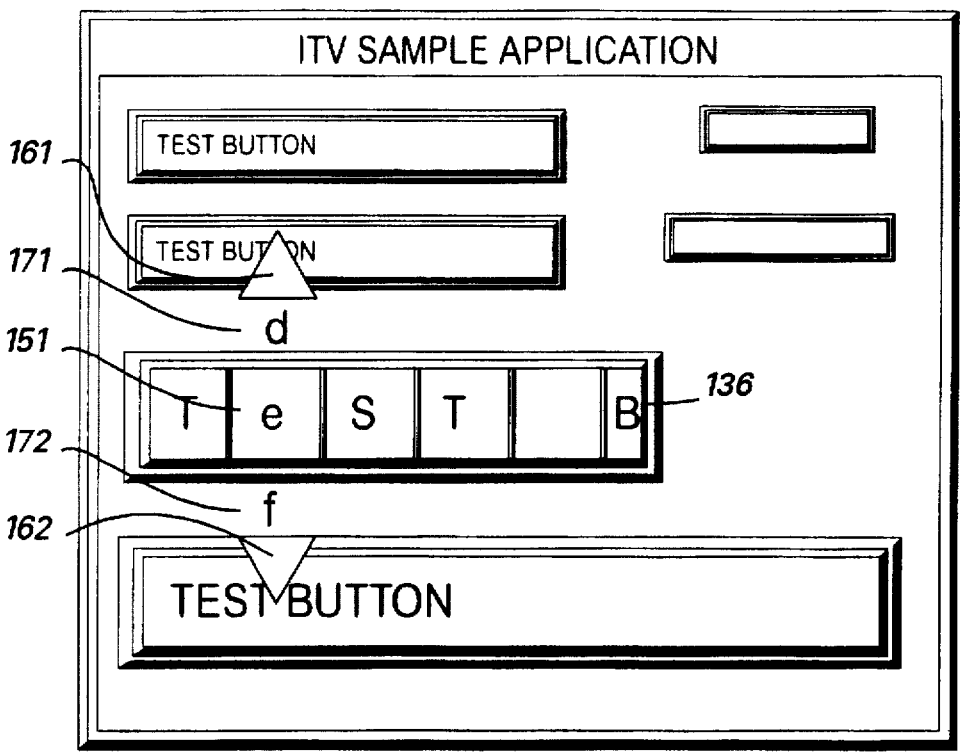
FIG. 6 shows a control object utilizing a character spin dial in accordance with an alternative embodiment of the present invention.

An alternative embodiment of the present invention is shown in FIG. 6. The enlarged and segmented display of characters in the control object is identical to the preferred embodiment of FIG. 5. However, the display of the character spin dial in FIG. 6 is slightly different. The alternative embodiment displays the character in the list that will be subsequently displayed in the cell should the character spin dial be used to scroll through the list of permitted characters. For example, the character "d" 171 is displayed between the cell 151 and the up arrow 161. If the spin dial is scrolled upward, then the character "d" is the next character that will be displayed in the cell 151. Character "f" 172 is similarly displayed between the cell 151 and down arrow 162. If the spin dial is scrolled downward, then the character "f" is the next character that will be displayed in the cell 151. For every character displayed in the cell, the preceding character in the list is displayed between the cell 151 and the up arrow 161, and the succeeding character is displayed between the cell 151 and the down arrow 162. In this manner, the display of preceding and succeeding characters provides a predictable mechanism to suggest to the user the proper direction in which to scroll to display the desired character in the cell.

To exit the modal state and allow shifting of focus to a neighboring control object, the user again presses the action button 118. Pressing the action button removes the up and down arrows 161, 162 associated with the character spin dial from the display. Also, exiting the modal state returns the characters to their original, non-enlarged size, and the segmentation of characters in distinct cells is removed such that the control object 135c is displayed as seen in FIG. 5.

Figure 7A:
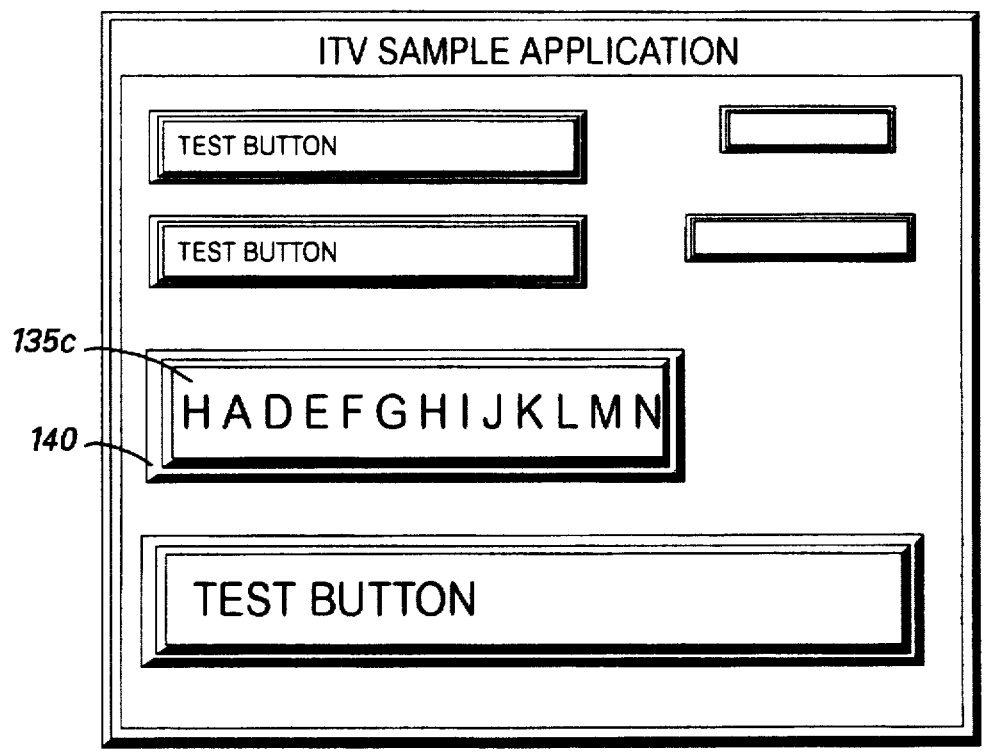
FIGS. 7A–L shows the control object as it would be displayed at various stages of character entry and editing.
Figure 7B:
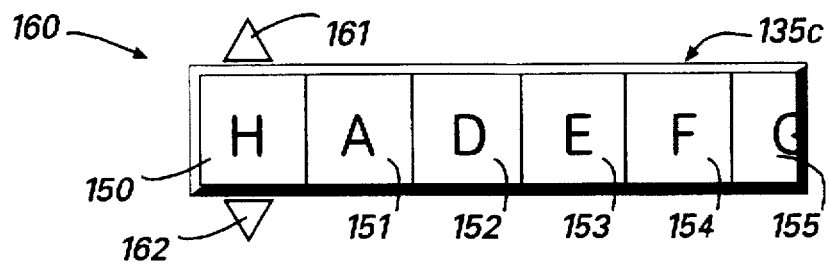

FIGS. 7A–L show the sequence of displays that would appear during the entry and editing of the characters displayed in the control object 135c. In this example, the user desires the characters in the control object to begin with the character "A" and proceed through the alphabet as follows: ABCDEFG, etc. FIG. 7A shows a display screen as it would appear when the user navigates to position focus on control object 135c. When the user presses the action button 118 on the remote control 80, shown in FIG. 3, the display of the control object appears as shown in FIG. 7B. The characters are seen to be enlarged and segmented in distinct cells. A character spin dial 160 is shown on the first cell 150 including up arrow 161 and down arrow 162.

Figure 7C:
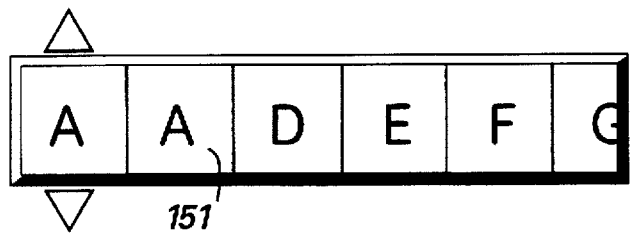
Figure 7D:
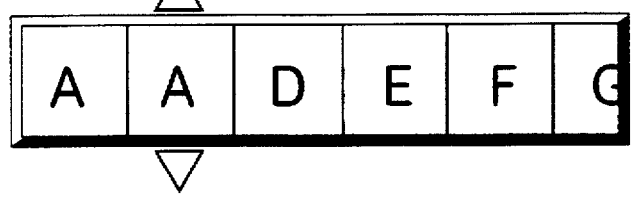
Figure 7E:
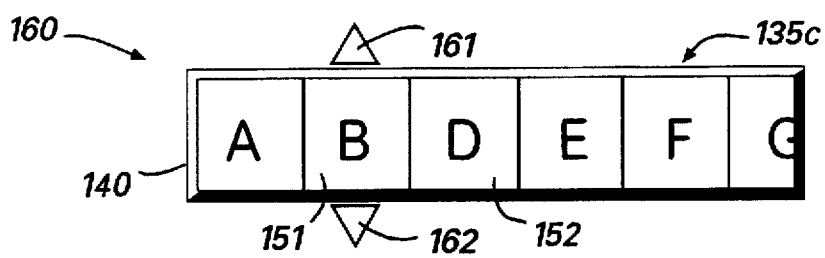

The user then presses the directional control on the remote control to the up position 116a or the down position 116b to scroll through the list of permitted characters that can be entered in the control object. When the character "A" is positioned in the cell 150, as shown in FIG. 7C, the user presses the directional control to the right position 116d to shift the character spin dial to adjacent cell 151, as shown in FIG. 7D. Pressing the directional control to shift the spin dial to the next adjacent cell serves to enter the character selected in the previous cell. Thus, the character "A" is entered in cell 150.

Figure 7F:
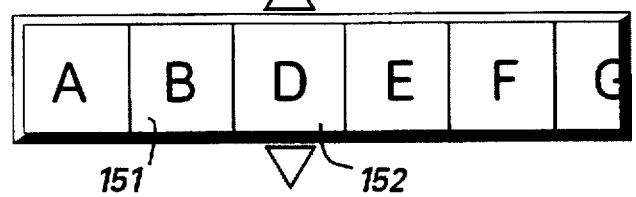

Similarly, the user can scroll upward and downward through the list of permitted characters by using the spin dial on cell 151. When character "B" is displayed in cell 151, as shown in FIG. 7E, the user again presses the directional control on the remote control to the right position 116d. The spin dial is then shifted to cell 152 and character "B" is entered in cell 151, as shown in FIG. 7F.

Figure 7G:
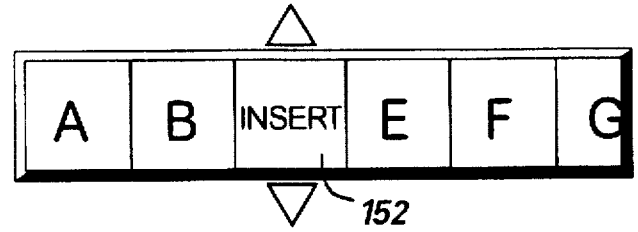
Figure 7H:
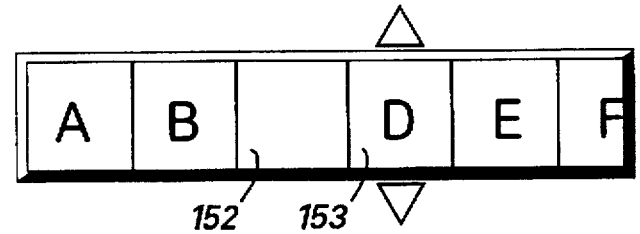

Because the user wishes to insert the character "C" between character "B" in cell 151 and character "D" in cell 152, the user manipulates the character spin dial to scroll to the character that represents the insert function, as shown in FIG. 7G. The user then presses the directional control to the right position to shift the spin dial to cell 153 and insert a space in cell 152, as shown in FIG. 7H. Preferably, the character in the cell in which the insert character was displayed is displayed in the cell following the insertion. Thus, character "D" follows the space inserted in cell 152, and is shifted from cell 152 to cell 153.

Figure 7I:
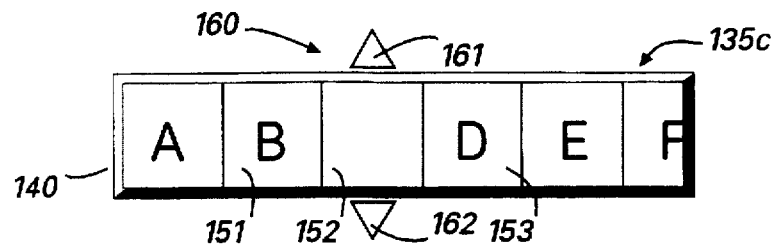
Figure 7J:
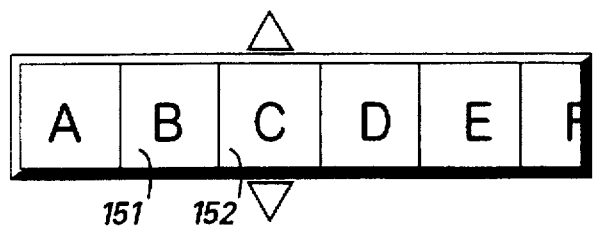

The user then presses the directional control to the left position to shift the character spin dial from cell 153 to cell 152, as shown in FIG. 7I. The user then uses the spin dial to scroll through the list of characters until character "C" is displayed in cell 152, as shown in FIG. 7J. To enter character "C" in cell 152, the user presses the directional control to either the left or right position. Alternatively, the user can enter characters by pressing the action button 118. Pressing the action button causes all characters present in the cells to be entered and causes the system to exit the modal state.

Figure 7K:
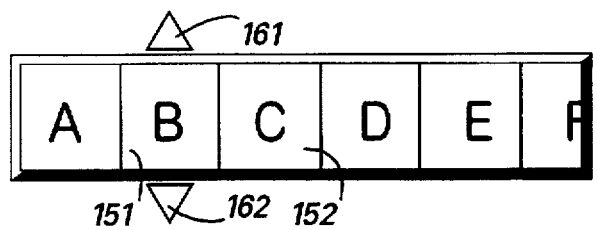
Figure 7L:
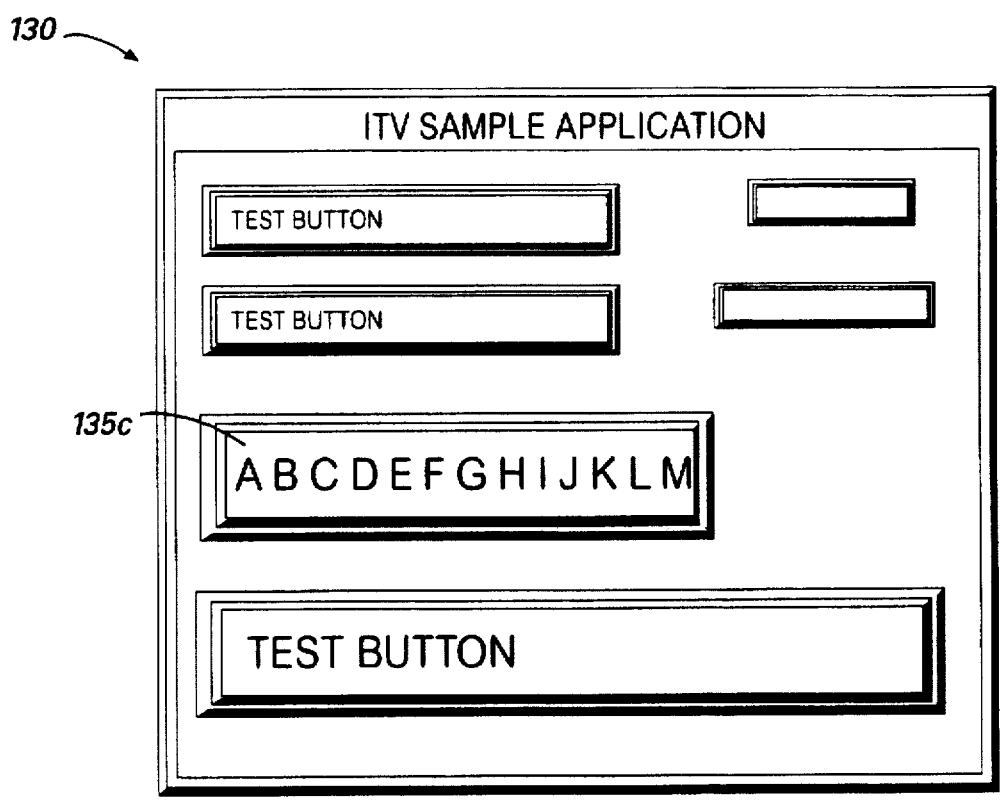

In FIG. 7K, the user has pressed the direction control to the left position to shift the spin dial to cell 151. After all desired character entry has been completed, the user presses the action button 118 to exit the modal state and return the display of the characters to their original non-enlarged, non-segmented state. In FIG. 7L, the characters are displayed as being reduced to their original size, the characters are no longer displayed in distinct cells, and the character spin dial, including up and down arrows 161, 162 is removed from the display.

Figure 8:
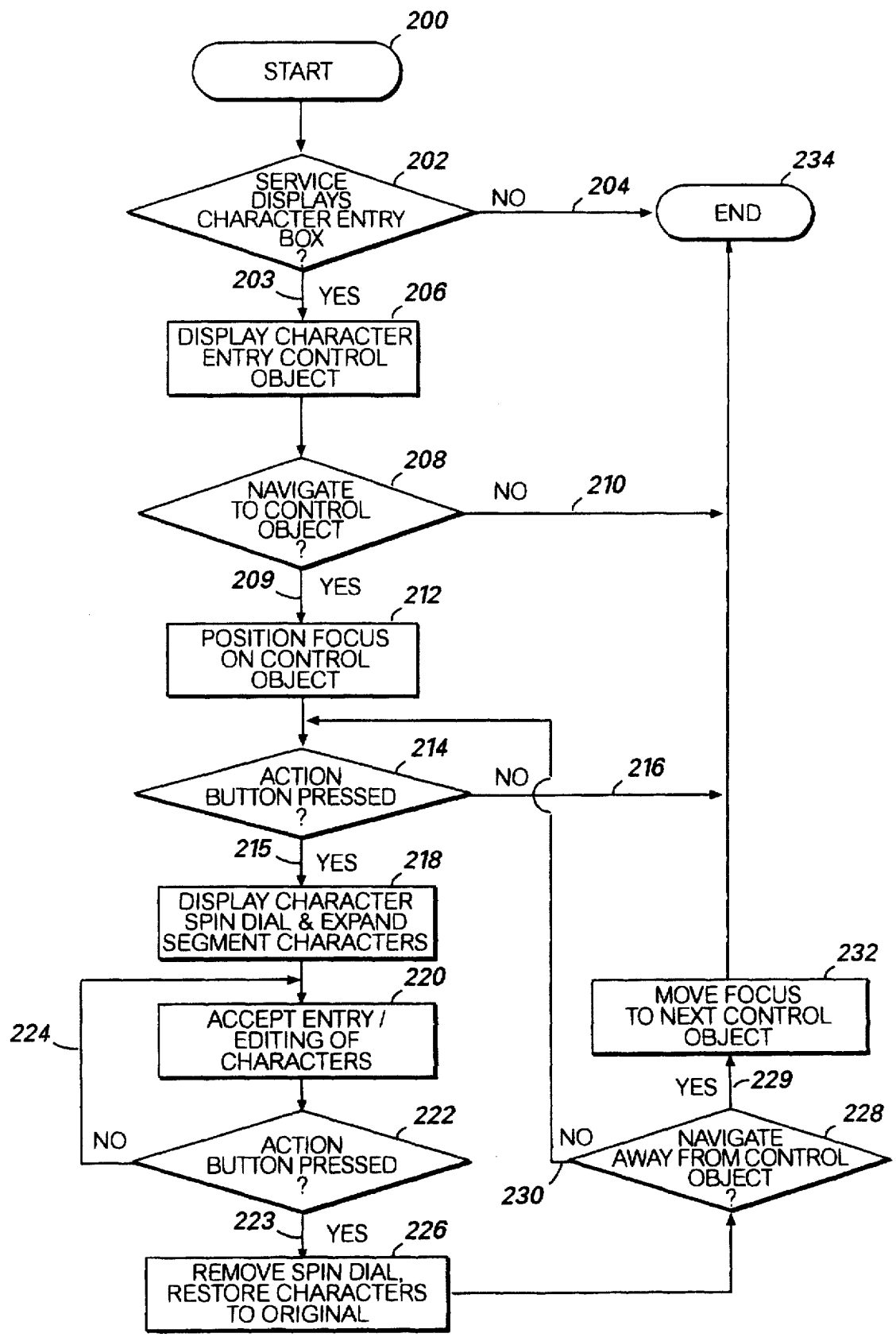
FIG. 8 is a flow chart of the steps required to display and accept character entry in a control object on a display screen in accordance with the present invention.

FIG. 8 is a flow chart illustrating the steps required to display and accept character entry in a control object on a display screen in accordance with the present invention. The method described in FIG. 8 is implemented via software in the remote control unit and the set-top terminal in conjunction with application software associated with the subscriber service being utilized by the user.

The method begins at 200. At step 202, the software in the set-top terminal determines whether a control object that permits character entry in association with the subscriber service is to be displayed. If so, the method follows "yes" branch 203 to step 206, where the control object is displayed on the display screen. If no character entry is permitted in any control object, the method follows "no" branch 204 and the method terminates at 234.

When the control object is displayed on the display screen at step 206, the method then determines whether the user has manipulated the remote control to navigate to the control object that permits character entry. If the user has navigated to the control object that permits character entry, the method follows "yes" branch 209 to step 212, where focus is positioned on the control object. If the user has not navigated to the control object, the method follows "no" branch 210 and the method terminates at 234.

At step 214, the method determines whether the user has activated the action button on the remote control. If the user has pressed the action button, the method follows "yes" branch 215 to step 218, where the contents of the control object are expanded, segmented into distinct cells, and a character spin dial is displayed in association with a cell. If the action button has not been pressed, the method follows "no" branch 216 and the method terminates at 234.

At step 220, the method accepts the entry and editing of characters in the control object via the character spin dial. At step 222, it is determined whether the action button has again been pressed. If the user has pressed the action button on the remote control, the method follows "yes" branch 223 to step 226, where the character spin dial is removed from the display, the characters are restored to their original size, and the segmentation of characters into cells is removed from the display. If the action button has not been pressed, the method follows "no" branch 224 and returns to step 220, where the method continues to accept character entry until the action button is pressed.

At step 228, it is determined whether the user has navigated away from the control object that permits character entry. If the user has navigated away by manipulating the directional control of the remote control, the method follows "yes" branch 229 to step 232, where focus is moved to the next neighboring control object on the display screen in accordance with the user's input. The method then terminates at 234. If the user has not navigated away from the control object, the method follows "no" branch 230 and returns to step 214 to determine whether the action button has again been pressed to again allow character entry in the control object.

In summary, the present invention provides a system for displaying a control object in which characters may be entered or edited. Each character and empty space in which a character may be entered is displayed in a separate cell within the control object. Each cell can accept the entry or editing of characters therein via a character spin dial. The character spin dial is displayed to the user as an up arrow and a down arrow displayed above and below the cell, respectively. By manipulating the directional control on the remote control in the up or down position, the user scrolls the character spin dial through a list of selectable characters until the desired character is displayed in the cell.

From the foregoing, it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for entering and editing characters on a display screen, comprising the steps of:
    displaying a control object on said display screen for displaying characters therein;
    creating a plurality of segmented cells within said control object, each segmented cell containing a single one of said characters;
    displaying the characters in said segmented cells within said control object on said display screen;
    displaying a character spin dial associated with a selected one of said segmented cells on said display screen;
    manipulating said character spin dial to change said single character presented in said selected segmented cell to another one of said characters; and
    displaying said other character in said selected segmented cell on said display screen.

2. The method of claim 1 wherein the characters displayed in each cell are enlarged relative to the characters as displayed in said control object.

3. The method of claim 1 wherein said steps of displaying the characters of said control object in cells, displaying a character spin dial, and manipulating said character spin dial are performed responsive to user input.

4. The method of claim 1 further comprising displaying a focus frame around said control object, said focus frame operative to supply a visual indication of user control of said control object.

5. The method of claim 4 wherein said visual indication includes an altered border surrounding said control object.

6. The method of claim 3 wherein said user input comprises moving focus to said control object and selecting said control object.

7. The method of claim 3 wherein said user input is provided via a remote control unit.

8. The method of claim 1 wherein each said cell is of equal width.

9. The method of claim 2 wherein the size of said control object is not enlarged when said characters are enlarged.

10. The method of claim 1 wherein manipulating said character spin dial causes said characters to be scrolled and individually displayed in said selected segmented cell.

11. The method of claim 10 wherein said character spin dial provides a visual indication that said characters can be scrolled through said selected segmented cell.

12. The method of claim 11 wherein said visual indication comprises an up arrow displayed above said selected segmented cell for controlling the scrolling of said characters upward through said selected segmented cell and a down arrow displayed below said selected segmented cell for controlling the scrolling of said characters downward through said selected segmented cell.

13. The method of claim 12 wherein said character spin dial displays the next one of said characters to be displayed in said selected segmented cell, when scrolling upward, between said up arrow and said selected segmented cell and displays the next one of said characters to be displayed in said cell selected segmented, when scrolling downward, between said down arrow and said selected segmented cell.

14. The method of claim 10 wherein said characters include letters.

15. The method of claim 10 wherein said characters include numerals.

16. The method of claim 10 wherein said characters include punctuation marks.

17. The method of claim 10 wherein said characters include symbols.

18. The method of claim 10 wherein said characters include graphics.

19. The method of claim 10 wherein said characters include international characters used in a foreign language.

20. The method of claim 10 wherein said characters include editing functions.

21. A system, in connection with an interactive network system, for displaying characters on a display screen, comprising:
- a control object displayed on said display screen;
- segmented cells displayed within said control object for displaying characters therein, each segmented cell containing a single one of said characters; and
- a character spin dial displayed on said display screen in association with a selected one of said segmented cells for scrolling a list of selectable characters through said selected segmented cell.

22. The system of claim 21 wherein the characters displayed in each cell are enlarged relative to the characters as displayed in said control object.

23. The system of claim 21 wherein said segmented cells are displayed, and said character spin dial is manipulated, responsive to user input.

24. The system of claim 21 further comprising displaying a focus frame displayed in association with said control object, said focus frame operative to supply a visual indication of user control of said control object.

25. The system of claim 24 wherein said visual indication includes an altered border surrounding said control object.

26. The system of claim 23 wherein said user input comprises moving focus to said control object and selecting said control object.

27. The system of claim 23 wherein said user input is provided via a remote control unit.

28. The system of claim 21 wherein each said cell is of equal width.

29. The system of claim 22 wherein the size of said control object is not enlarged when said characters are enlarged.

30. The system of claim 21 wherein manipulating said character spin dial causes said list of selectable characters to be scrolled and individually displayed in said selected segmented cell.

31. The system of claim 30 wherein said character spin dial provides a visual indication that said characters can be scrolled through said selected segmented cell.

32. The system of claim 31 wherein said visual indication comprises an up arrow displayed above said selected segmented cell for controlling the scrolling the list of selectable characters upward through said selected segmented cell and a down arrow displayed below said selected segmented cell for controlling the scrolling the list of selectable characters downward through said selected segmented cell.

33. The system of claim 32 wherein said character spin dial displays the next one of said characters to be displayed in said selected segmented cell, when scrolling upward, between said up arrow and said selected segmented cell and displays the next one of said characters to be displayed in said selected segmented cell, when scrolling downward, between said down arrow and said selected segmented cell.

34. The system of claim 30 wherein said characters include letters.

35. The system of claim 30 wherein said characters include numerals.

36. The system of claim 30 wherein said characters include punctuation marks.

37. The system of claim 30 wherein said characters include symbols.

38. The system of claim 30 wherein said characters include graphics.

39. The system of claim 30 wherein said characters include international characters used in a foreign language.

40. The system of claim 30 wherein said characters include editing functions.

41. A computer-implemented method for entering characters on a display screen to compose a user-generated message, comprising the steps of:

(a) displaying a control object having a plurality of independent segmented cells on the display screen, each cell containing at least one character;

(b) displaying a character spin dial in association with one of the cells, the spin dial being operative to display a plurality of selectable characters;

(c) entering a single one of the plurality of selectable characters into the cell associated with the character spin dial; and (d) repeating steps (b) and (c) for each cell in the control object to form the user-generated message on the display screen, the plurality of selectable characters displayed in the character spin dial on the display screen does not depend on any prior entry of characters into the plurality of independent segmented cells in the control object.

42. The method of claim 41, further comprising the steps of:

(e) editing the user-generated message by enabling the character spin dial in association with one of the cells;

(f) entering another one of the plurality of selectable characters into the cell associated with the character spin dial; and (g) repeating steps (e) and (f) for the cells in the control object containing characters that require editing.

43. The method of claim 41 wherein each cell is of equal width.

44. The method of claim 41 wherein the character spin dial provides a visual indication that the selectable characters can be scrolled through the cell associated with the character spin dial.

45. The method of claim 44 wherein the visual indication comprises a visual indicator displayed above the cell associated with the character spin dial for controlling the scrolling of the plurality of selectable characters upward through the cell associated with the character spin dial and another visual indicator displayed below cell associated with the character spin dial for controlling the scrolling of the plurality of selectable characters downward through the cell associated with the character spin dial.

\* \* \* \* \*